(12) United States Patent
Mondragon et al.

(10) Patent No.: US 8,929,082 B2
(45) Date of Patent: Jan. 6, 2015

(54) AIRLINE PASSENGER SEAT MODULAR USER INTERFACE DEVICE

(75) Inventors: Christopher K. Mondragon, Laguna Niguel, CA (US); Nigel Greig, Auckland (NZ); Edward Scholten, Auckland (NZ); Roy Moody, Auckland (NZ); Paul Simmonds, Auckland (NZ); Elaine Clarke, Auckland (NZ); Thomas Allen Darbonne, Santa Cruz, CA (US)

(73) Assignees: Thales Avionics, Inc., Irvine, CA (US); Phitek Systems, Ltd., Auckland (NZ)

( * ) Notice: Subject to any disclaimer, the term of this patent is extended or adjusted under 35 U.S.C. 154(b) by 845 days.

(21) Appl. No.: 13/109,143

(22) Filed: May 17, 2011

(65) Prior Publication Data

US 2012/0039048 A1 Feb. 16, 2012

Related U.S. Application Data

(60) Provisional application No. 61/345,286, filed on May 17, 2010.

(51) Int. Cl.
*H05K 7/00* (2006.01)
*B60N 2/48* (2006.01)
(Continued)

(52) U.S. Cl.
CPC .......... *B60N 2/4876* (2013.01); *B60R 11/0235* (2013.01); *B64D 11/0015* (2013.01); *B60R 2011/0012* (2013.01); *B60N 2002/0264* (2013.01)
USPC ........... 361/728; 361/731; 361/735; 361/736; 361/679.4; 439/620.18; 439/652; 439/724

(58) Field of Classification Search
USPC ......... 439/540.1, 620.18, 527, 652, 701, 717, 439/724; 200/51.02, 51.03; 725/76, 77; 361/728, 729, 730, 731, 733, 735, 736, 361/679.4
See application file for complete search history.

(56) References Cited

U.S. PATENT DOCUMENTS 1,368,307 A 2/1921 Waldron
1,498,727 A 6/1924 Haskel
(Continued)

FOREIGN PATENT DOCUMENTS

CN 1101203 A 4/1995
CN 1213626 A 4/1999
(Continued)

OTHER PUBLICATIONS

International Search Report and Written Opinion of the International Searching Authority, PCT International Application No. PCT/US11/36741, Aug. 19, 2011.

*Primary Examiner* — Hoa C Nguyen
*Assistant Examiner* — Binh Tran
(74) *Attorney, Agent, or Firm* — Myers Bigel Sibley & Sajovec, P.A.

(57) ABSTRACT

A module carrier unit comprises a plurality of passenger interface modules that perform different functions, the functions including at least one of inputting and outputting information, the modules having a common size, shape, and interface; an outer case portion comprising a plurality of receptacles, each having a common size, shape, and interface designed to receive one of the modules, the plurality of receptacles being such that a first module having a first function is operable in a first receptacle, and a second module having a second function is operable in the first receptacle, the modules being removably connected to the receptacles; and a communications interface that performs at least one of transmitting and receiving data to and from a processor located near a seat of a passenger in the vehicle.

14 Claims, 4 Drawing Sheets

(51) Int. Cl.
  *B60R 11/02* (2006.01)
  *H05K 5/00* (2006.01)
  *H05K 1/14* (2006.01)
  *G06F 1/16* (2006.01)
  *H01R 13/66* (2006.01)
  *H01R 25/00* (2006.01)
  *H01R 11/09* (2006.01)
  *B64D 11/00* (2006.01)
  *B60R 11/00* (2006.01)
  *B60N 2/02* (2006.01)

(56) References Cited

U.S. PATENT DOCUMENTS

| | | |
|---|---|---|
| 1,514,152 A | 11/1924 | Gernsback |
| 1,586,140 A | 5/1926 | Bonnette |
| 1,807,225 A | 5/1931 | Pack |
| 2,346,395 A | 4/1944 | Rettinger |
| 2,379,891 A | 7/1945 | Eckardt |
| 2,427,844 A | 9/1947 | Eklöv |
| 2,490,466 A | 12/1949 | Olson et al. |
| 2,603,724 A | 7/1952 | Kettler |
| 2,622,159 A | 12/1952 | Herman |
| 2,714,134 A | 7/1955 | Touger et al. |
| 2,761,912 A | 9/1956 | Touger et al. |
| 2,775,309 A | 12/1956 | Villchur |
| 2,848,560 A | 8/1958 | Wiegand et al. |
| 2,972,018 A | 2/1961 | Hawley et al. |
| 2,989,598 A | 6/1961 | Touger et al. |
| 3,073,411 A | 1/1963 | Bleazey et al. |
| 3,112,005 A | 11/1963 | Shaw et al. |
| RE26,030 E | 5/1966 | Marchand et al. |
| 3,367,040 A | 2/1968 | Vani |
| 3,403,235 A | 9/1968 | Bishop |
| 3,532,837 A | 10/1970 | Dyar et al. |
| 3,602,329 A | 8/1971 | Bauer |
| 3,644,939 A | 2/1972 | Beguin |
| 3,727,004 A | 4/1973 | Bose |
| 3,766,332 A | 10/1973 | Carlson et al. |
| 3,927,262 A | 12/1975 | Goeckel |
| 3,997,739 A | 12/1976 | Kishikawa et al. |
| 4,005,267 A | 1/1977 | Görike et al. |
| 4,005,278 A | 1/1977 | Görike |
| 4,006,318 A | 2/1977 | Sebesta et al. |
| 4,027,117 A | 5/1977 | Nakamura |
| 4,041,256 A | 8/1977 | Ohta et al. |
| 4,058,688 A | 11/1977 | Nishimura et al. |
| 4,156,118 A | 5/1979 | Hargrave |
| 4,158,753 A | 6/1979 | Görike |
| 4,211,898 A | 7/1980 | Atoji et al. |
| 4,297,537 A | 10/1981 | Babb |
| 4,338,489 A | 7/1982 | Görike |
| 4,347,405 A | 8/1982 | Davis |
| 4,399,334 A | 8/1983 | Kakiuchi et al. |
| 4,403,120 A | 9/1983 | Yoshimi |
| 4,418,248 A | 11/1983 | Mathis |
| 4,441,576 A | 4/1984 | Allen |
| 4,455,675 A | 6/1984 | Bose et al. |
| 4,494,074 A | 1/1985 | Bose |
| 4,527,282 A | 7/1985 | Chaplin et al. |
| 4,528,689 A | 7/1985 | Katz |
| 4,529,058 A | 7/1985 | Emery |
| 4,572,324 A | 2/1986 | Fidi et al. |
| 4,581,496 A | 4/1986 | Sweany |
| 4,592,366 A | 6/1986 | Sainomoto et al. |
| 4,644,581 A | 2/1987 | Sapiejewski |
| 4,646,872 A | 3/1987 | Kamon et al. |
| 4,669,129 A | 6/1987 | Chance |
| 4,670,733 A | 6/1987 | Bell |
| 4,742,887 A | 5/1988 | Yamagishi |
| 4,809,811 A | 3/1989 | Görike |
| 4,847,908 A | 7/1989 | Nieuwendijk et al. |
| 4,852,177 A | 7/1989 | Ambrose |
| 4,893,695 A | 1/1990 | Tamura et al. |
| 4,905,322 A | 3/1990 | Aileo et al. |
| 4,922,542 A | 5/1990 | Sapiejewski |
| 4,949,806 A | 8/1990 | Hofer |
| 4,985,925 A | 1/1991 | Langberg et al. |
| 4,989,271 A | 2/1991 | Sapiejewski et al. |
| 5,001,763 A | 3/1991 | Moseley |
| 5,020,163 A | 6/1991 | Aileo et al. |
| 5,117,461 A | 5/1992 | Moseley |
| 5,134,659 A | 7/1992 | Moseley |
| 5,181,252 A | 1/1993 | Sapiejewski et al. |
| 5,182,774 A | 1/1993 | Bourk |
| 5,208,868 A | 5/1993 | Sapiejewski |
| 5,267,321 A | 11/1993 | Langberg |
| 5,305,387 A | 4/1994 | Sapiejewski |
| 5,343,523 A | 8/1994 | Bartlett et al. |
| 5,497,426 A | 3/1996 | Jay |
| 5,504,281 A | 4/1996 | Whitney et al. |
| 5,640,302 A * | 6/1997 | Kikinis .................... 361/679.41 |
| 5,652,799 A | 7/1997 | Ross et al. |
| 5,675,658 A | 10/1997 | Brittain |
| 5,740,257 A | 4/1998 | Marcus |
| 5,913,178 A | 6/1999 | Olsson |
| 5,937,070 A | 8/1999 | Todter et al. |
| 5,970,160 A | 10/1999 | Nilsson et al. |
| 6,061,456 A | 5/2000 | Andrea et al. |
| 6,163,615 A | 12/2000 | Callahan |
| 6,278,786 B1 | 8/2001 | McIntosh |
| 6,597,792 B1 | 7/2003 | Sapiejewski et al. |
| 6,665,189 B1 * | 12/2003 | Lebo ............................ 361/730 |
| 6,831,984 B2 | 12/2004 | Sapiejewski |
| 7,103,188 B1 | 9/2006 | Jones |
| 7,248,705 B1 | 7/2007 | Mishan |
| 7,445,507 B1 | 11/2008 | Parker |
| 7,588,472 B2 | 9/2009 | Oliveti et al. |
| 7,695,292 B2 | 4/2010 | Lee |
| 2002/0015501 A1 | 2/2002 | Sapiejewski |
| 2006/0258226 A1 | 11/2006 | Milan |
| 2007/0061847 A1 | 3/2007 | Callahan et al. |
| 2008/0189748 A1 | 8/2008 | Bleacher et al. |
| 2009/0288123 A1 * | 11/2009 | Havlovick et al. .......... 725/77 |
| 2011/0003505 A1 * | 1/2011 | Greig et al. ............... 439/540.1 |

FOREIGN PATENT DOCUMENTS

| | | |
|---|---|---|
| DE | 35 12 405 A1 | 10/1985 |
| DE | 37 06 481 A1 | 9/1987 |
| DE | 87 03 084.5 U1 | 11/1987 |
| EP | 0 195 641 A2 | 9/1986 |
| EP | 0 195 641 B1 | 6/1993 |
| EP | 0 582 404 A2 | 2/1994 |
| EP | 0 414 479 B1 | 9/1995 |
| EP | 0 582 404 A3 | 12/1995 |
| EP | 0 688 143 A2 | 12/1995 |
| EP | 0 873 040 A2 | 10/1998 |
| EP | 0 688 143 B1 | 8/2001 |
| FR | 2 595 178 A1 | 9/1987 |
| GB | 1 379 372 A | 1/1975 |
| GB | 2 000 941 A | 1/1979 |
| GB | 2 168 220 A | 6/1986 |
| GB | 2 172 470 A | 9/1986 |
| GB | 2 187 361 A | 9/1987 |
| GB | 2 188 210 A | 9/1987 |
| GB | 2 234 882 A | 2/1991 |
| JP | 4-227396 A | 8/1992 |
| NL | 8101815 | 11/1981 |
| WO | WO 91/13429 A1 | 9/1991 |
| WO | WO 95/00946 A1 | 1/1995 |
| WO | WO 95/08907 A1 | 3/1995 |
| WO | WO 98/41974 A2 | 9/1998 |

* cited by examiner

AIRLINE PASSENGER SEAT MODULAR USER INTERFACE DEVICE

CROSS REFERENCE TO RELATED APPLICATIONS

The present application claims the benefit of U.S. Provisional Application No. 61/345,286, filed May 17, 2010, entitled, "Airline Passenger Seat Modular User Interface Device", herein incorporated by reference.

BACKGROUND

The present invention relates to the field of modular user interfaces for computer-based systems used in vehicles, particularly to in-flight entertainment (IFE) systems.

IFE systems provide passengers with a wide range of entertainment options, from listening to audio, watching video, playing video games, etc.

Historically, user interfaces for an IFE have been designed with interface elements—headphone jacks, video jacks, and the like—directly mounted within a seating element, such as an armrest or other structural element near the passenger. However, when such an interface element becomes non-functional, it is difficult and costly to replace. Furthermore, as technology advances, and new forms of standardized interfaces evolve, the directly mounted elements cannot be easily upgraded to take advantage of such advances.

SUMMARY

Accordingly, various embodiments of the invention provide for a module carrier unit, comprising: a plurality of passenger interface modules that perform different functions, the functions including at least one of inputting and outputting information, the modules having a common size, shape, and interface; an outer case portion comprising a plurality of receptacles, each having a common size, shape, and interface designed to receive one of the modules, the plurality of receptacles being such that a first module having a first function is operable in a first receptacle, and a second module having a second function is operable in the first receptacle, the modules being removably ("removably" meaning that there are no permanently affixed wires or adhesives used) connected to the receptacles; and a communications interface that performs at least one of transmitting and receiving data to and from a processor located near a seat of a passenger in the vehicle.

A module carrier that is an integrated vehicle passenger interface and communication unit is provided that comprises an outer case with a number of sockets. Passenger interface modules having a predefined shape and size, and each containing a different interface unit, can be plugged into various sockets of the communication unit. When one of the modules becomes non-functional, or a different configuration is desired, the modules can easily be removed and replaced.

Although an in-flight entertainment system is described, it should be understood that use of the terms "flight", "aircraft", and the like herein are proxies used for the sake of convenience that apply to and are defined as being associated with broader concepts of "travel" and "vehicle", and the like. Furthermore, the term "entertainment" data is defined broadly as any data that may be of interest to the passenger.

BRIEF DESCRIPTION OF THE DRAWINGS

Various embodiments of the invention are illustrated below in the drawings.

MODULE CARRIER AS AN INTEGRATED VEHICLE PASSENGER INTERFACE

Figure 1:
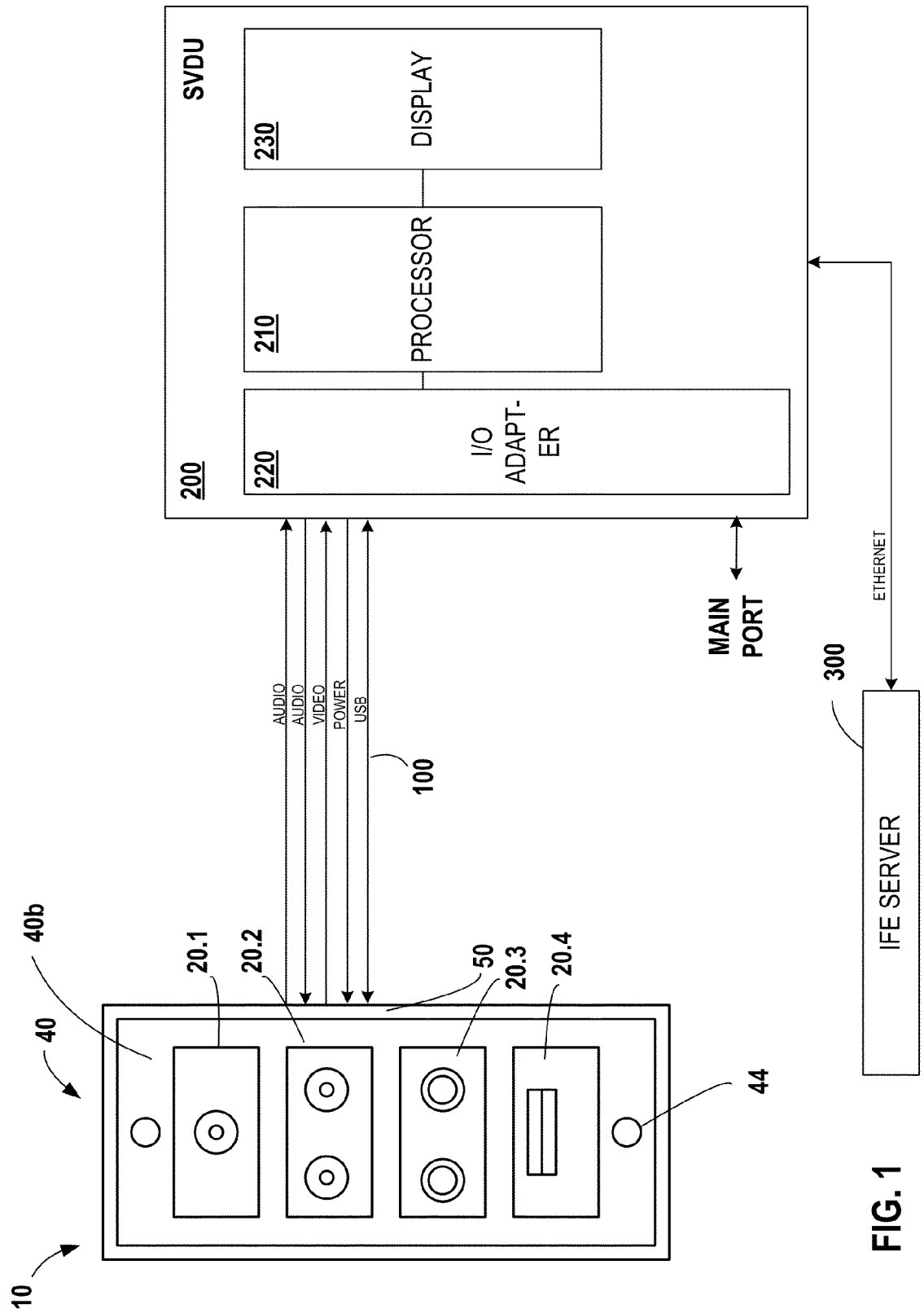
FIG. 1 is a pictorial top view diagram illustrating an embodiment of a module carrier unit having inserted modules, and a block schematic diagram illustrating the associated IFE components.
Figure 2C:
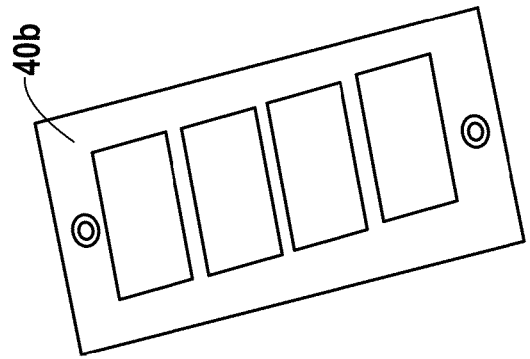
FIG. 2C is a perspective view of a faceplate that covers the communications unit.
Figure 2B:
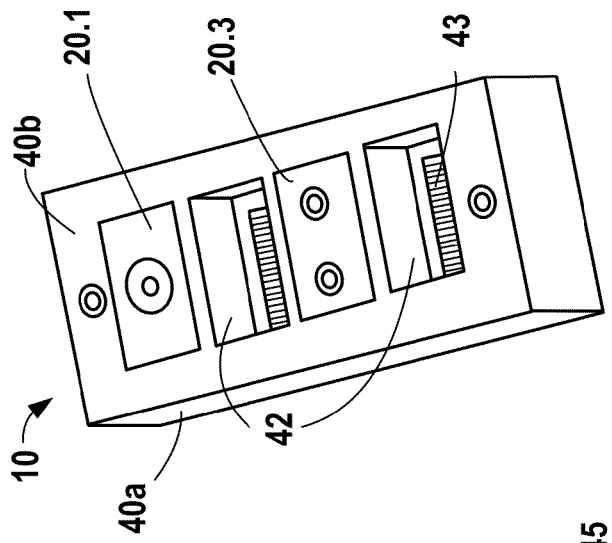
FIG. 2B is a perspective view of the communications unit shown in FIG. 2A.
Figure 2D:
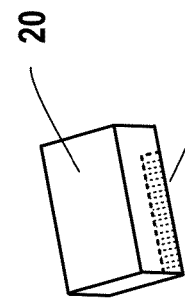
FIG. 2D is a perspective view of a passenger interface module that may be inserted into the communication unit.
Figure 2A:
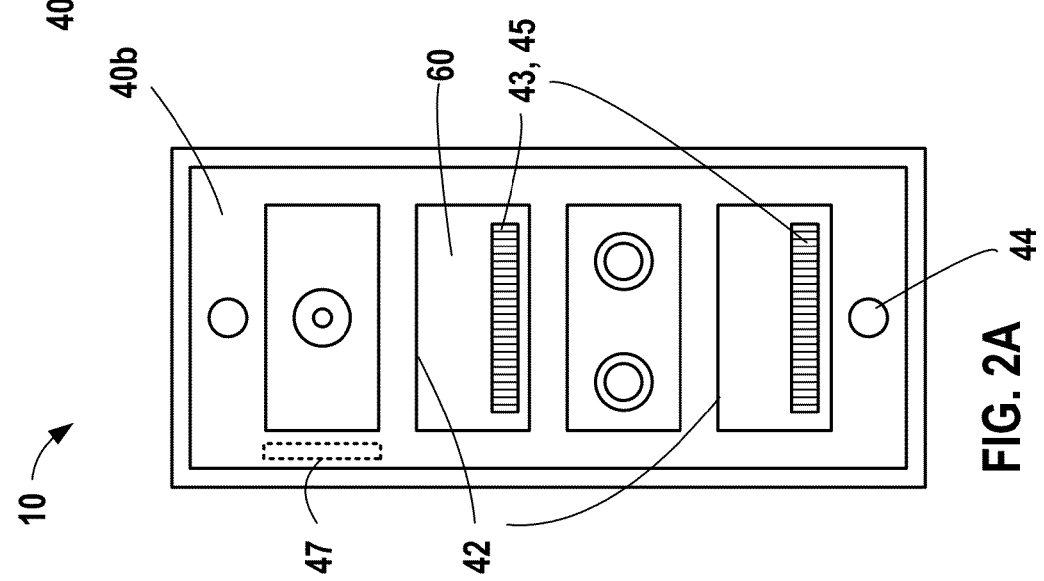
FIG. 2A is a pictorial top view of the communications unit with two of the modules removed, showing the sockets.

FIG. 1 illustrates a system using an exemplary embodiment of a module carrier unit 10 that connects into an entertainment system 200, 300 of a vehicle.

In this system, a primary server 300 comprises storage that is used to store entertainment-related data, such as multi-media content, programs, such as games, and other related data and programs that might be of interest to a vehicle passenger.

A seat video display unit (SVDU) 200 is located near the seat of the passenger and comprises an interface back to the server 300 over which entertainment system-related data is transmitted. The SVDU 200 comprises, among other things, a processor 210, an I/O adapter 220 for communicating both with the carrier unit 10 and the server 300, and a display 230, such as an LCD, LED, plasma, touchscreen, or other type of known display. The SVDU 200 contains hardware and software for processing multi-media or other related data. The carrier unit 10 may be located in an arm rest, near the display, or any other location that is readily accessible by a seated passenger.

The carrier unit 10 could be mounted in a cavity of the seating area (not shown) of a size designed to accept the unit 10. The mounting could comprise fasteners, such as screws, bolts, and the like, but could also include various locking mechanisms such as slots and tabs, and the like.

As can be seen in FIG. 1, a communications interface 100 is provided between the carrier unit 10 and the SVDU 200. This interface 100 can provide two-way communications that includes information such as video data, audio data, user interface control data, game data, etc. In one embodiment, the communications interface 100 comprises two USB lines, a video line, an audio line, and a power line that may be used to power the carrier unit 100. The carrier unit 100 connects to the I/O adapter 220 of the SVDU 200. This connection can be either hardwired or could use any connector of a suitable grade. Similarly, the connection to the carrier unit 10 can be hardwired or use a similar connector.

The personal carrier unit 10, as shown in FIG. 1, comprises a number of passenger interface modules (smart Passenger Interface Module—PIM) 20. The exemplary modules shown include an RCA video jack module 20.1, RCA audio left and right jack module 20.2, an audio headphone module 20.3, and a USB module 20.4. Other modules can be envisioned, such as a DIN connector module, a module that permits turning an overhead light on and off, and an attendant call/cancel button.

Referring additionally to FIGS. 2A-D, it can be seen that the carrier unit 10 comprises an outer case 40 made up of a bottom portion 40a and a faceplate 40b that can be affixed to the bottom portion 40a with one or more fasteners 44. The faceplate 40b could also be affixed using tabs, slots, and the like, as well. Holes in the faceplate 40b can be used to help secure the modules 20 into the carrier unit 10.

The bottom portion 40a may comprise a group of similarly shaped and sized sockets 42, into which the passenger interface modules 20 are inserted. The modules 20 are designed with a common shape and size so that any module 20 can plug into any socket 42. Importantly, a common interface between the modules 20 and the sockets 42 is defined. The modules 20 may comprise a connector 22 in the form of pins, electrical contacts, etc. that are designed to mate with corresponding sockets or electrical contacts 43 that form a bus 45 of the carrier unit 10. A module lock 47 may be provided to help ensure that the modules remain in the socket. Such a lock could be formed, e.g., by a sliding mechanism that slides an interfering surface on top of a surface of the module that prevents its removal from the socket 42 via an interference fit. Such locks 47 could be placed on both sides of the module 20, and could be placed adjacent to each module 20.

The modules 20 themselves are designed to be relatively easy to remove from the sockets 42 and replace. This may involve, e.g., removing the faceplate 40b, releasing the module lock 47, or other simple mechanical procedures. However, the module 20 is preferably not more permanently affixed in the sockets 42 through the use, e.g., of soldered wires, adhesives, and the like.

In a preferred embodiment, the modules 20 are very simply designed. For example, the audio connectors can be designed simply to pass through the analog audio signal via a simple pair of conductors to corresponding lines on the bus 45 of the carrier unit 10. Similarly, digital communication modules 20, such as a USB 2.0 connector, can simply pass through the signals directly via connectors to the bus 45. This is consistent with keeping the cost of the modules 20 very inexpensive and easy to replace if they are damaged. Furthermore, with a very simple design, the likelihood of failure is relatively small.

However, it is also possible to have relatively smart modules 20 used as well. In such a configuration, the modules can comprise electronic circuitry or even processors for handling complex signal processing, such as MP3 conversion to audio signals, video decompression and decoding, wireless communications (e.g., Wi-Fi, Bluetooth), etc. Modules such as a web camera and microphone could also be included.

In a preferred embodiment, the carrier unit 10 is designed to be of a size to fit in an existing footprint for such controls in present airplanes. Therefore, although any number of sockets 42 could be provided, a preferred embodiment uses four sockets 42. As can be seen in the example presented above, where the number or size of the interface device, such as the RCA audio/video, makes it impossible to fit on a single module 20, the interface can be split across multiple modules 20.

The carrier unit 10 may comprise a printed circuit board (PCB) 60 upon which the socket connectors 43 are positioned. The PCB 60 may also comprise a processor, volatile and non-volatile memory, and the I/O adapter 50, as well as other circuitry, such as level shifting circuitry, analog-to-digital (A/D) and digital-to-analog (D/A) converters, and other signal conditioning circuitry to translate signals received from user devices to the SVDU 200, and vice versa. The processor and software may also comprise algorithms for handling various communications protocols that can be utilized both by user devices and for communicating with the SVDU 200.

The module type is automatically determined and the carrier unit 10 contains circuitry that permits it to accommodate and adapt to the functional needs of the module 20 that is inserted.

It is further possible to connect a plurality of carrier units 10 to each other in order to expand the number of modules 20 used in the system. In such a configuration, the communications bus 100 can be shared between the carriers 10. This can be the case in which a plurality of carrier units 10 are tethered together, where one carrier unit 10 is (or multiple carrier units 10 are) mounted, e.g., on the SVDU 200, or in any other mounting or configuration of the carrier units 10.

Figure 3:
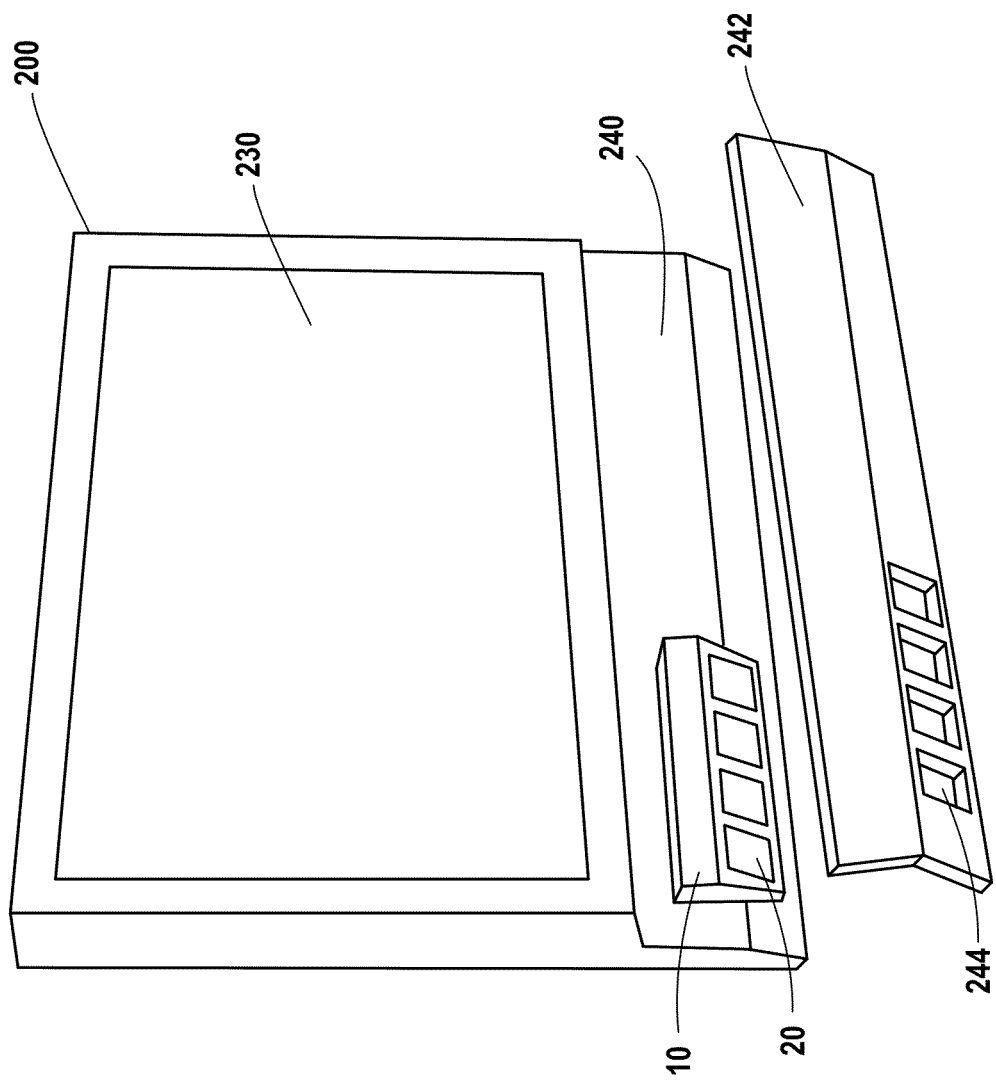
FIG. 3 is a perspective view of a display having the carrier unit mounted on it.

FIG. 3 illustrates an embodiment in which the carrier unit 10 comprising modules 20 is mounted to the SVDU 200. In this embodiment, the carrier unit 10 is affixed to a bottom portion 240 of the display unit 200, and a cover 242 having access holes 244 is placed over the bottom portion 240 and the carrier unit 10 in order to provide an aesthetic look and feel. Thus, the carrier unit 10 is integrated into the SVDU 200.

Although not shown, the carrier unit 10 could also be located in a part of the passenger's seat, such as in the arm rest or other portion. In such a configuration, it is also possible to provide a cable or tether that connects the carrier unit 10 with the SVDU 200.

Figure 4:
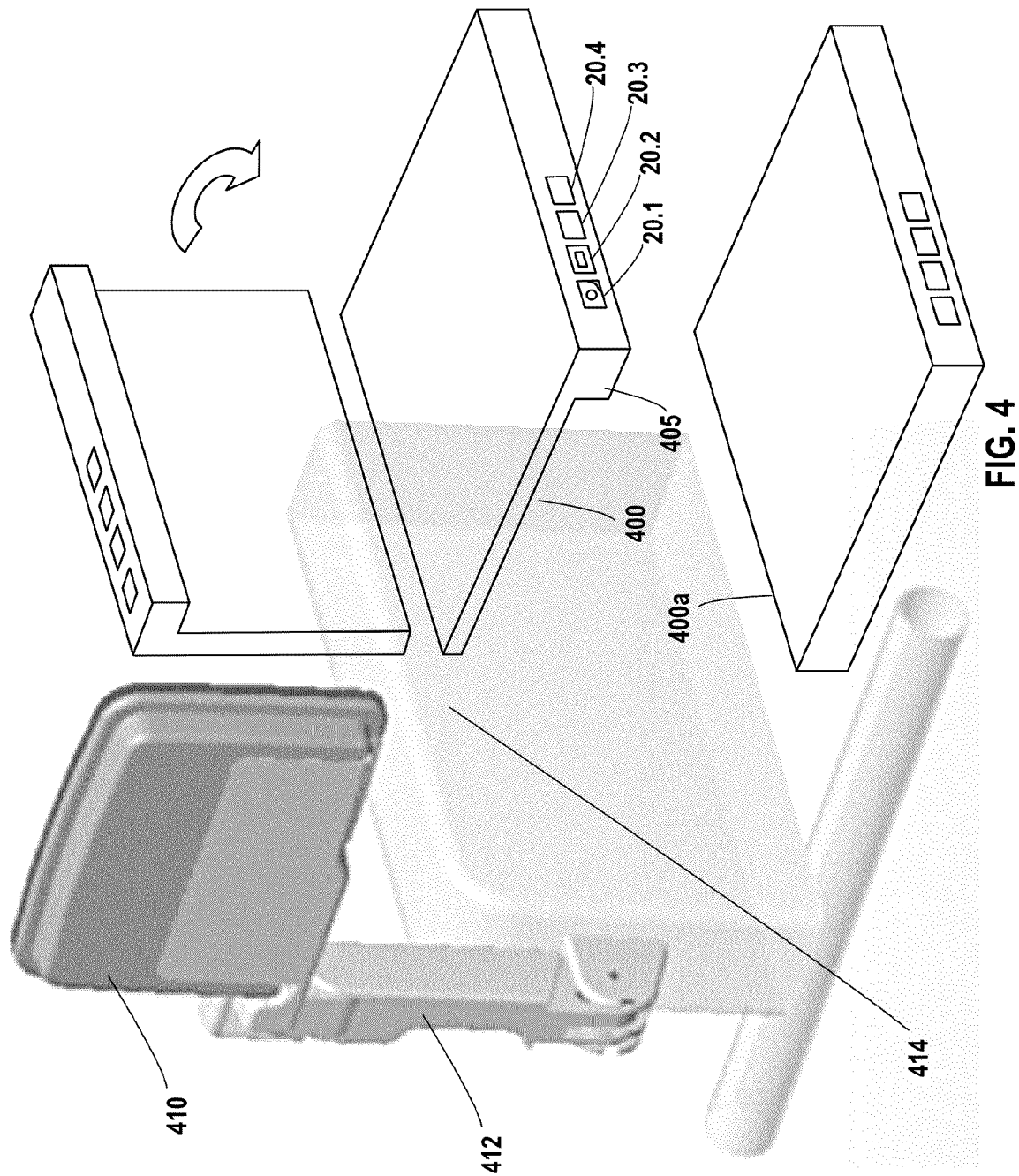
FIG. 4 is a pictorial perspective view of a further embodiment.

A further embodiment of the invention is shown in FIG. 4. In this embodiment, the passenger interface modules 20.x are integrated into a passenger tray table 400. The tray table 400 is typically located within a tray storage area 414 to which a display 410 and display arm 412 holding the display may be affixed.

The upper two images of the tray table 400 show a thin tray design having a broadened end portion 405 that is wide enough to accommodate the modules 20. In the bottom image, a thick tray design 400a is provided that can accommodate additional electronics, etc.

Although FIG. 4 shows the modules located in a preferable position on a front part of the tray table, it is possible that they could be located on either side or even on the top surface of the tray. However, when the modules 20 are located on the side surface of the tray 400 (depending on the tray configuration), they can be advantageously accessed even when the tray is in a stowed position. In other configurations for storing the tray 400, the modules 20 can be placed so that they are accessible when the tray 400 is stowed.

The integration of the modules 20 into the tray table advantageously creates additional space for passengers and respective peripherals, particularly in front-row economy seating (and other space-limited seating) where space is at a premium. By integrating the modules 20 into the tray table 400, 400a, peripherals no longer protrude into the seat area and are more easily accessible. In addition, this design also provides access to PSS functions such as attendant call/cancel, volume, channel.

The system or systems described herein may be implemented on any form of computer or computers and the components may be implemented as dedicated applications or in client-server architectures, including a web-based architecture, and can include functional programs, codes, and code segments. Any of the computers may comprise a processor, a memory for storing program data and executing it, a permanent storage such as a disk drive, a communications port for handling communications with external devices, and user interface devices, including a display, keyboard, mouse, etc. When software modules are involved, these software modules may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

| TABLE OF REFERENCE CHARACTERS | |
|---|---|
| 10 | (module) carrier unit, integrated vehicle passenger interface and communication unit |
| 20, 20.x | passenger interface module, connector insert |
| 22 | module connector |
| 40 | outer case |
| 40a | outer case bottom portion |
| 40b | outer case faceplate |
| 42 | socket, hole |
| 43 | socket connector |
| 44 | outer case fastener |
| 45 | interface unit bus |
| 47 | module lock |
| 50 | I/O adapter |
| 60 | interface unit PCB |
| 100 | communications interface |
| 200 | seat video display unit |
| 210 | processor, passenger proximate processor, processor board |
| 220 | SVDU I/O adapter |
| 230 | display, screen |
| 240 | display bottom portion |
| 242 | display cover |
| 244 | display cover holes |
| 300 | in-flight entertainment system server |
| 400 | tray table |
| 405 | broadened end portion |
| 410 | display |
| 412 | display arm |
| 414 | tray storage area |

What is claimed is:

1. A video display unit for a vehicle, comprising
a module carrier unit directly affixed to a portion of the video display unit, comprising:
  a plurality of passenger interface modules that perform different functions, the functions including at least one of inputting signals from one or more user devices and outputting signals to one or more user devices, the modules having a common size and shape case and a common electrical connector;
  an outer case portion comprising a plurality of recessed sockets, each having a common size and shape and a common electrical connector, the plurality of sockets being configured so that any one of the passenger interface modules having the different functions is connectable to any one of the sockets to electrically mate the electrical connector of the one of the passenger interface modules to the electrical connector of the one of the sockets; and
  a communications interface connected to a processor located near a seat of a passenger in the vehicle; and a cover panel having holes in it, the cover panel being affixed to a portion of the video display unit and covering the module carrier unit while providing access to the passenger interface modules through the holes.

2. The video display unit according to claim 1, wherein:
the passenger interface modules are selected from the group consisting of a USB port, a DIN audio port, a headphone jack, an RCA video jack, RCA stereo audio jacks, and an attendant call button.

3. The video display unit according to claim 1, wherein the outer case portion is generally rectangular in shape.

4. The video display unit according to claim 1, wherein while the video display unit is upright the module carrier unit is directly affixed to the video display unit below a display.

5. The video display unit according to claim 1, further comprising:
a printed circuit board (PCB) comprising a bus extending between spaced apart electrical contacts which mate with the electrical connectors of the passenger interface modules while connected to the sockets.

6. The video display unit according to claim 5, wherein the PCB comprises:
a processor that processes signals sent to the one or more user devices through one or more of the passenger interface modules or that processes signals received from the one or more user devices through one or more of the passenger interface modules; and
memory by the processor during processing.

7. The video display unit according to claim 6, further comprising:
a communication protocol algorithm stored in the memory that when executed by the processor causes the processor to interface with the one or more user devices through one or more of the passenger interface modules.

8. The video display unit of claim 5, wherein the PCB comprises electrical signal level shifting circuitry that translates signals received from or provided to a user device connected to one of the passenger interface modules connected to one of the sockets of the module carrier unit.

9. The video display unit of claim 5, wherein the PCB comprises an analog-to-digital converter that translates signals received from or provided to a user device connected to one of the passenger interface modules connected to one of the sockets of the module carrier unit.

10. The video display unit of claim 5, wherein the PCB comprises a digital-to-analog converter that translates signals received from or provided to a user device connected to one of the passenger interface modules connected to one of the sockets of the module carrier unit.

11. The video display unit according to claim 1, further comprising:
hardware that performs multiplexed communication between the passenger interface modules and the processor through the communication interface.

12. The video display unit of claim 1, wherein:
the passenger interface modules while connected to the sockets of the module carrier unit provide a signal conductive pathway between the one or more user devices and an in-flight entertainment (IFE) server of an IFE system.

13. The video display unit of claim 1, further comprising circuitry configured to accommodate and adapt to a functional need of one of the passenger interface modules connected to one of the sockets of the module carrier unit.

14. The video display unit of claim 1, wherein the cover panel retains the passenger interface modules within the sockets while covering the module carrier unit.

* * * * *